United States Patent
Ito et al.

(10) Patent No.: US 8,049,986 B2
(45) Date of Patent: Nov. 1, 2011

(54) CONTROL METHOD FOR MAGNETIC DISK DEVICE, MAGNETIC DISK DEVICE, AND MAGNETIC DISK

(75) Inventors: Kenya Ito, Kanagawa (JP); Takehiko Hamaguchi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 168 days.

(21) Appl. No.: 12/543,845

(22) Filed: Aug. 19, 2009

(65) Prior Publication Data

US 2010/0085657 A1  Apr. 8, 2010

(30) Foreign Application Priority Data

Oct. 3, 2008  (JP) .................................. 2008-258532

(51) Int. Cl.
  *G11B 21/02* (2006.01)
  *G11B 27/36* (2006.01)
  *G11B 5/09* (2006.01)
(52) U.S. Cl. ................................ 360/75; 360/31; 360/51
(58) Field of Classification Search .................. None
  See application file for complete search history.

(56) References Cited

U.S. PATENT DOCUMENTS

| 6,738,207 B1 * | 5/2004 | Belser et al. ..................... 360/31 |
| 2006/0119965 A1 | 6/2006 | Ohno .............................. 360/51 |
| 2009/0244765 A1 * | 10/2009 | Albrecht ......................... 360/75 |

FOREIGN PATENT DOCUMENTS

| JP | 2003/281701 | 10/2003 |
| JP | 2006/164349 | 6/2006 |

* cited by examiner

*Primary Examiner* — Andrew L Sniezek
(74) *Attorney, Agent, or Firm* — Zilka-Kotab, PC

(57) ABSTRACT

According to one embodiment, a control method for a magnetic disk device includes writing data by varying a phase of the array period of the plurality of magnetic elements or a phase of the time period of the recording signal in one section of the track from a corresponding phase in another section of the track, reading a reproduction signal from the track, and determining a phase shift between the array period of the plurality of magnetic elements and the time period of the recording signal, based on a reproduction signal read from the one section and a reproduction signal read from the other section. In another embodiment, a magnetic disk includes a track in which magnetic elements are magnetically separated and arranged in an array period, and a phase of the array period in one section is different from a phase in another section of the track.

20 Claims, 12 Drawing Sheets

(a)

(b)

(a)

(b)

CONTROL METHOD FOR MAGNETIC DISK DEVICE, MAGNETIC DISK DEVICE, AND MAGNETIC DISK

RELATED APPLICATIONS

The present application claims priority from a Japanese Patent Application filed Oct. 3, 2008 under Appl. No. 2008-258532, which is incorporated herein by reference.

FIELD OF THE INVENTION

The present invention relates to a control method for a magnetic disk device, a magnetic disk device, and a magnetic disk, and in particular, to a magnetic disk device including bit-patterned media.

BACKGROUND OF THE INVENTION

In recent years, bit-patterned media possessing a track in which a plurality of magnetic bits magnetically separated from each other are arranged periodically have been proposed. The bit patterned media possess an advantage in that noises originating from track boundaries or from recording transitions can be reduced, and another advantage is that thermal relaxation of the recorded magnetization can be suppressed.

However, in order to write data in bit-patterned media, one aspect of any magnetic head device or magnetic recording method is to ensure that the time period of a recording signal to be outputted to a magnetic head corresponds to the array period of magnetic bits.

Japanese Patent No. 2006-164349 discloses a method in which writing and reading of data is repeated by changing a phase of the time period of the recording signal gradually. Accordingly, a phase for which a bit error rate becomes minimal is determined. However, it is necessary for the conventional method discussed above to repeat a considerable number of times of writing and reading data before it accomplishes its goal.

Therefore, it is desirable to have a method of reading and writing bit-patterned media which does not involve many iterations of reading and writing steps, thereby saving time, energy, and efficiency of the mechanisms involved.

SUMMARY OF THE INVENTION

According to one embodiment, a control method for a magnetic disk device includes a magnetic disk possessing a track in which a plurality of magnetic elements magnetically separated from each other are arranged in a predetermined array period and a magnetic head which follows the track and writes data upon receiving a recording signal possessing a time period corresponding to an array period of the plurality of magnetic elements. The control method comprises the steps of writing the data by varying a phase of the array period of the plurality of magnetic elements or a phase of the time period of the recording signal in one section of the track from a corresponding phase in another section of the track, reading a reproduction signal from the track, and determining a phase shift between the array period of the plurality of magnetic elements and the time period of the recording signal, based on a reproduction signal read from the one section and a reproduction signal read from the other section.

In another embodiment, a magnetic disk device comprises a magnetic disk possessing a track in which a plurality of magnetic elements magnetically separated from each other are arranged in a predetermined array period, and a magnetic head operable to follow the track and to write data upon receiving a recording signal possessing a time period corresponding to the array period of the magnetic elements. The magnetic disk device also comprises a storage unit operable to store information on a phase of the time period of the recording signal, the phase being determined after determination of a phase shift between the array period of the magnetic elements and the time period of the recording signal, based on a reproduction signal read from one section of the track and a reproduction signal read from another section of the track, wherein after the data is written in the track by varying a phase of the array period of the plurality of magnetic elements or a phase of the time period of the recording signal in the one section from the corresponding phase in the other section. Furthermore, the magnetic disk device comprises a setting mechanism to set the phase of the time period of the recording signal to be outputted to the magnetic head, based on the information stored on the storage unit.

In another embodiment, a magnetic disk including a track in which a plurality of magnetic elements magnetically separated from each other are arranged in a predetermined array period, wherein a phase of the array period of the plurality of magnetic elements in one section of the track is different from a corresponding phase in another section of the track.

Other aspects and advantages of the present invention will become apparent from the following detailed description, which, when taken in conjunction with the drawings, illustrate by way of example the principles of the invention.

DETAILED DESCRIPTION

Figure 1:
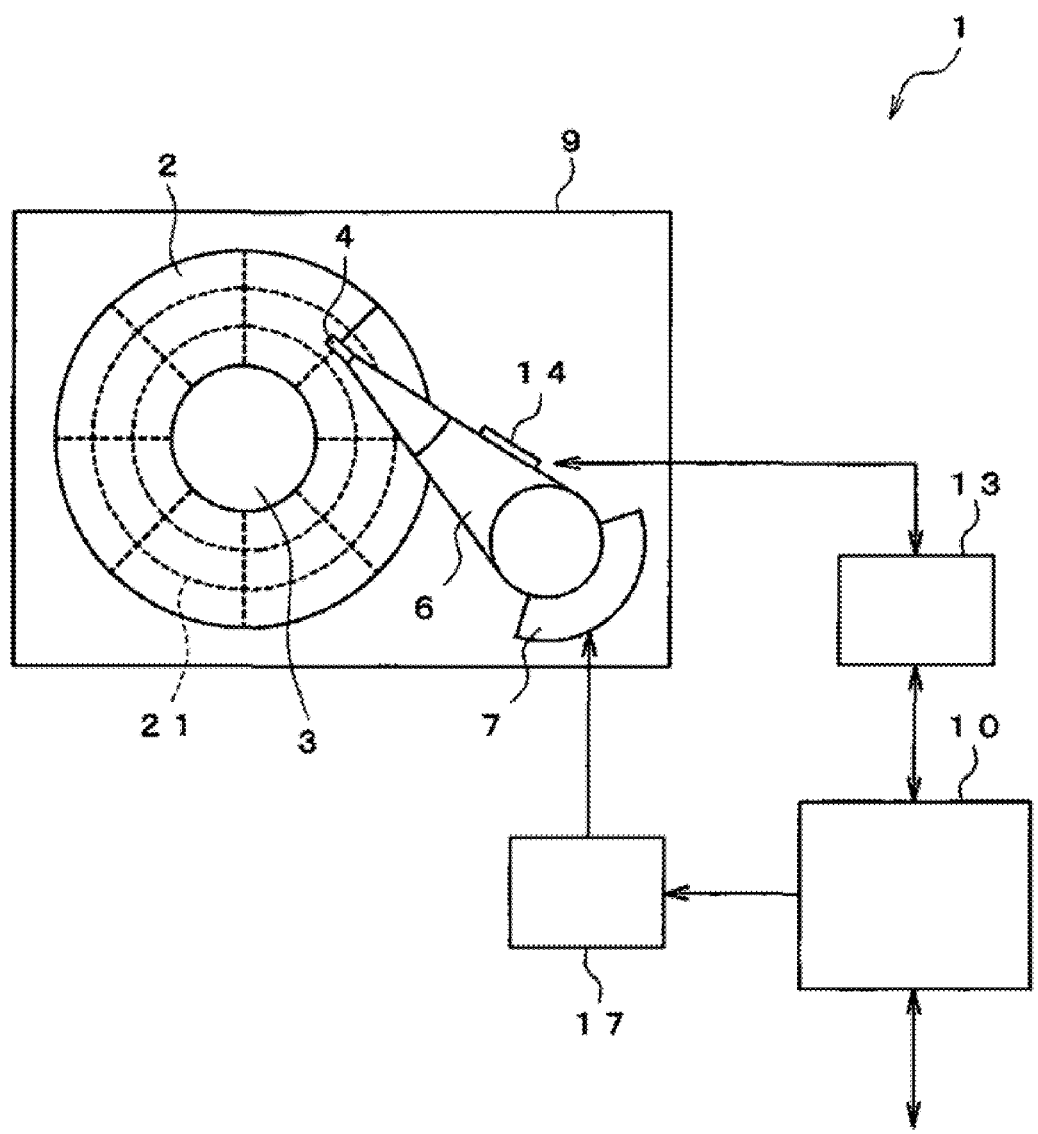
FIG. 1 is an explanatory block diagram illustrating an example of a magnetic disk device according to one embodiment.

The present invention, according to one embodiment, provides, as one goal, a control method for a magnetic disk device, a magnetic disk device, and a magnetic disk, in which a phase shift between an array period of a plurality of magnetic elements and a time period of a recording signal may be determined simply and quickly.

In order to address the problem, a control method according to one embodiment of the present invention is for a magnetic disk device including a magnetic disk possessing a track in which a plurality of magnetic elements magnetically separated from each other are arranged in a predetermined array period, and a magnetic head which follows the track and writes data upon receiving a recording signal possessing a time period corresponding to an array period of the plurality of magnetic elements. The control method comprises the steps of: writing the data by varying a phase of the array period of the plurality of magnetic elements or a phase of the time period of the recording signal in one section of the track from a corresponding phase in another section of the track; reading a reproduction signal from the track; and determining a phase shift between the array period of the plurality of magnetic elements and the time period of the recording signal, based on the reproduction signal read from the one section and the reproduction signal read from the other section.

In one illustrative embodiment of the present invention, the writing of the data is performed with the recording signal of which a level is reversed at every unit time period.

In one illustrative embodiment of the present invention, the phase of the array period of the plurality of magnetic elements or the phase of the time period of the recording signal in the one section is different from the corresponding phase in the other section by a half period.

In one illustrative embodiment of the present invention, determining the phase shift between the array period of the plurality of magnetic elements and the time period of the recording signal is performed based on an amplitude of the reproduction signal read from the one section and an amplitude of the reproduction signal read from the other section.

In the present illustrative embodiment, the presence or absence of the phase shift between the array period of the plurality of magnetic elements and the time period of the recording signal may be determined based on whether a difference greater than a predetermined magnitude exists or not between the amplitude of the reproduction signal read from the one section and the amplitude of the reproduction signal read from the other section.

In one illustrative embodiment of the present invention, the presence or absence of the phase shift between the array period of the plurality of magnetic elements and the time period of the recording signal is determined based on whether or not one of the amplitude of the reproduction signal read from the one section and the amplitude of the reproduction signal read from the other section is greater than a first threshold and whether the other amplitude is less than a second threshold which is smaller than the first threshold.

In one illustrative embodiment of the present invention, the presence or absence of the phase shift between the array period of the plurality of magnetic elements and the time period of the recording signal is determined, based on an error rate of the reproduction signal read from the one section and an error rate of the reproduction signal read from the other section.

In one illustrative embodiment of the present invention, after the phase shift is determined, the phase of the time period of the recording signal may be updated, and then the phase shift may be determined again.

In the present illustrative embodiment, increases and decreases of the phase of the time period of the recording signal may be determined, based on a magnitude of a relation between the amplitude of the reproduction signal before the updating and the amplitude of the reproduction signal after the updating.

In the present illustrative embodiment, an amount of updating of the phase of the time period of the recording signal may be determined based on a magnitude of a relation between an amplitude of the reproduction signal read from the one section and an amplitude of the reproduction signal read from the other section.

In one illustrative embodiment of the present invention, information on the phase of the time period of the recording signal may be stored in a storage unit, the phase being determined based on the determination result of the phase shift.

In one illustrative embodiment of the present invention, the phase of the time period of the recording signal to be outputted to the magnetic head may be set based on the information stored on (and read out from) the storage unit.

In one illustrative embodiment of the present invention, the reproduction signal may be read from the track in which the data is written by varying the phase of the array period of the plurality of magnetic elements or the phase of the time period of the recording signal in each of a plurality of sections, and the phase shift between the array period of the plurality of magnetic elements and the time period of the recording signal may be determined based on the reproduction signal read out from each of the plurality of sections.

According to another embodiment, a magnetic disk device comprises a magnetic disk possessing a track in which a plurality of magnetic elements magnetically separated from each other are arranged in a predetermined array period, a magnetic head which follows the track and writes data upon receiving a recording signal possessing a time period corresponding to the array period of the plurality of magnetic elements, a storage unit which stores information on a phase of the time period of the recording signal, the phase being determined after determination of phase shift between the array period of the plurality of magnetic elements and the time period of the recording signal based on a reproduction signal read from one section of the track and a reproduction signal read from the other section of the track, after the data is written in the track by varying a phase of the array period of the plurality of magnetic elements or a phase of the time period of the recording signal in one section from the corresponding phase in the other section, and a setting mechanism which sets the phase of the time period of the recording signal to be outputted to the magnetic head based on the information read out from the storage unit.

A magnetic disk according to one embodiment possesses a track in which a plurality of magnetic elements magnetically separated from each other are arranged in a predetermined array period, and a phase of the array period of the plurality of magnetic elements in one section of the track is different from a corresponding phase in another section of the track.

According to the present invention, even if writing and reading of information is repeated not so often as in the conventional method, the phase shift between the array period of a plurality of magnetic elements and the time period of a recording signal may be determined. Therefore, it is possible to determine the phase shift simply and quickly.

Figure 16:
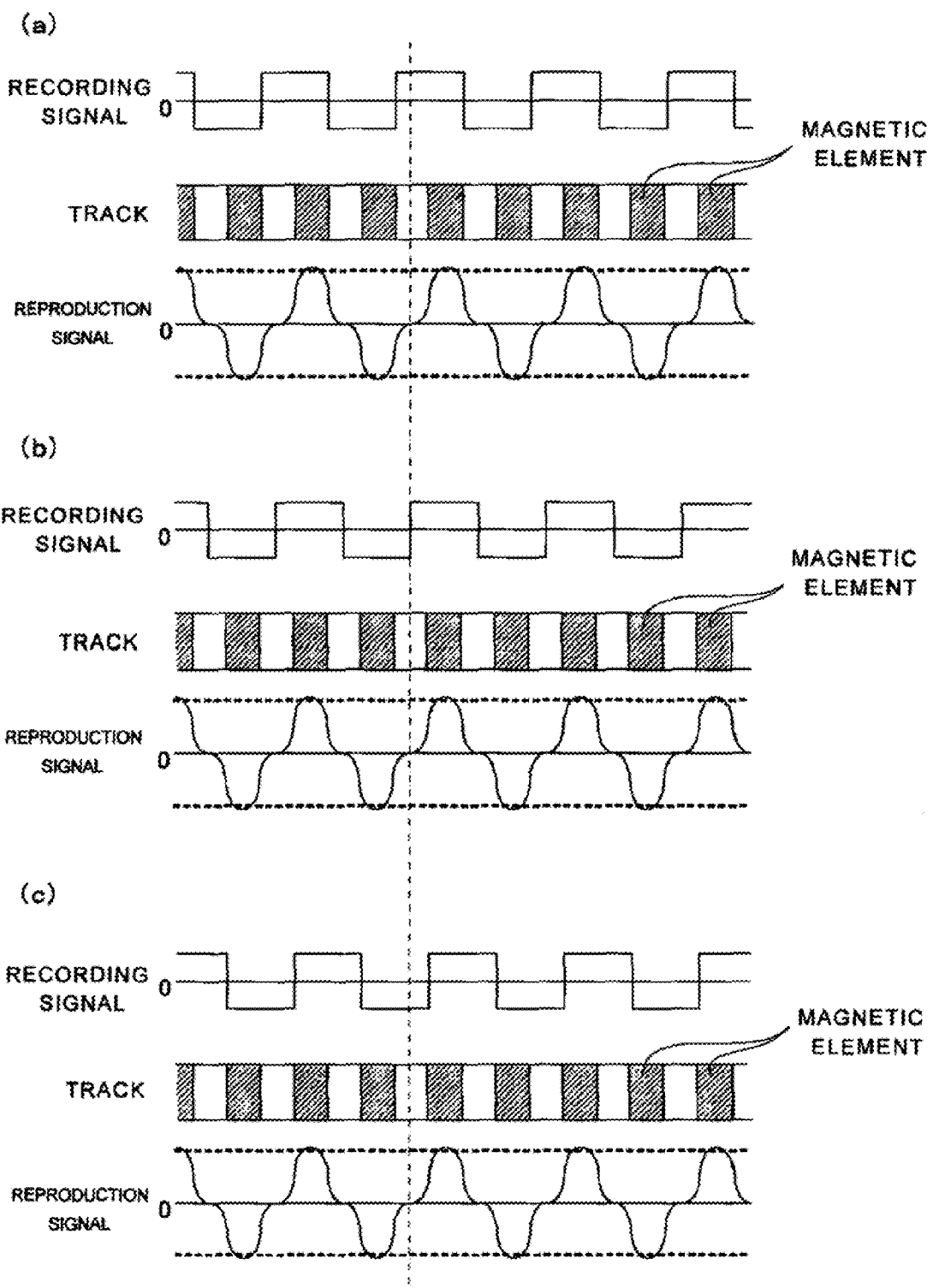
FIG. 16 is an explanatory chart illustrating the relationship between a recording signal and a reproduction signal.

In particular, according to the present invention, improvement of precision in determining the phase shift may be accomplished. That is, as illustrated in the example of FIG. 16, in writing data, even if the phase of the time period of a recording signal shifts somewhat with reference to the phase of the array period of the plurality of magnetic elements in some cases, the magnitude of the reproduction signal obtained from each of the cases may be the same. However, it is possible to detect such a small amount of phase shift, by varying the phase of the array period of the plurality of magnetic elements or the phase of the time period of the recording signal in one section of the track from the corresponding phase in the other section, as in one embodiment.

Now, embodiments of the present invention are explained referring to the various figures.

FIG. 1 is a block diagram illustrating an example of the constitution of a magnetic disk device 1 according to one embodiment of the present invention. A drive housing 9 of the magnetic disk device 1 houses a magnetic disk 2 and a head assembly 6. The magnetic disk 2 is a bit patterned medium, and is attached to a spindle motor 3 provided in the bottom of the drive housing 9.

The head assembly 6 is supported rotatably next to the magnetic disk 2. A magnetic head 4 is supported at the fore-end of the head assembly 6. On the other end, a voice coil motor 7 is provided at the back-end of the head assembly 6. The voice coil motor 7 drives the head assembly 6 rotationally, and moves the magnetic head 4 in an approximately radial direction over the magnetic disk 2.

Figure 2:
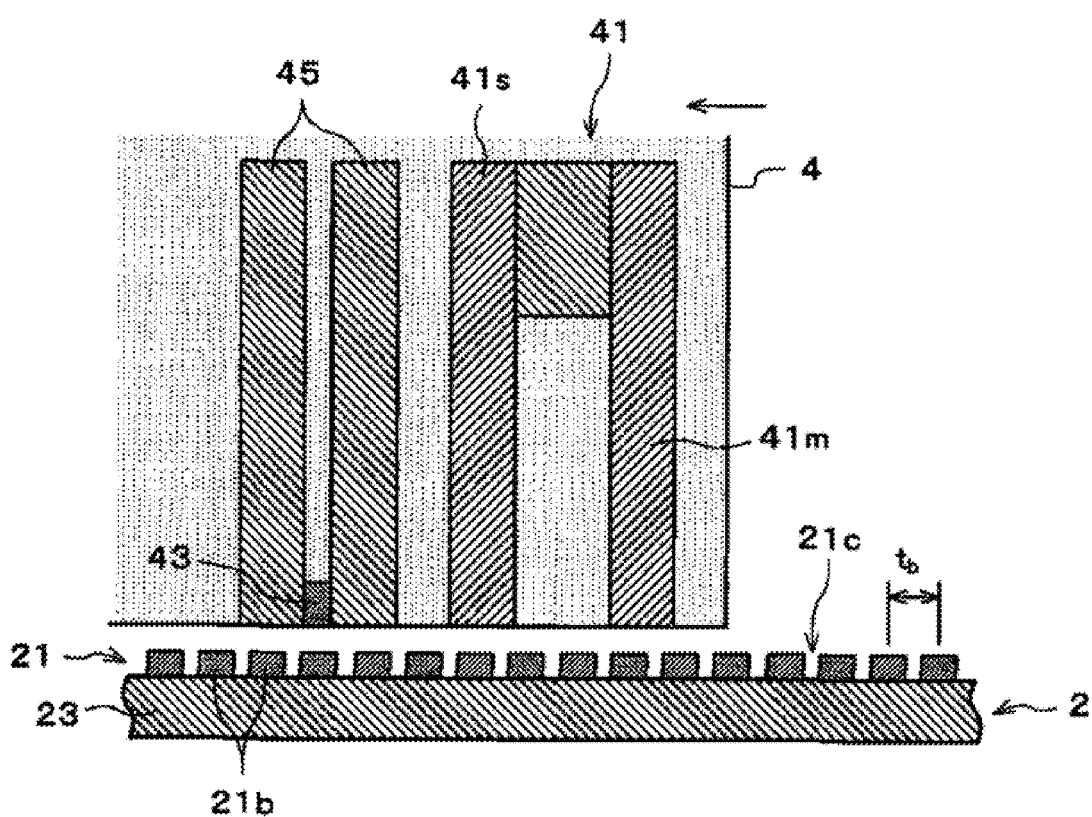
FIG. 2 is an explanatory diagram of a magnetic disk and a magnetic head according to one embodiment.

FIG. 2 is an explanatory diagram of the magnetic disk 2 and the magnetic head 4. The magnetic disk 2 possesses a track 21 in which a plurality of magnetic bits (magnetic elements) 21$b$ magnetically separated from each other are arranged in a predetermined array period $t_b$. These magnetic bits 21$b$ are formed by patterning a magnetic layer formed over a nonrecording layer 23. Between adjacent magnetic bits 21$b$, a groove (a non-magnetic bit 21$c$) is formed by removing the magnetic layer. Accordingly, each magnetic bit 21$b$ is separated magnetically. The groove may be filled with a non-magnetic material.

The magnetic head 4 floats very closely over the rotating magnetic disk 2, and follows the track 21. The magnetic head 4 includes a recording element 41 and a reproducing element 43 at the trailing edge. The recording element 41 may be a single-pole-type recording head as illustrated in FIG. 2, for example, including a main magnetic pole 41$m$ and a sub magnetic pole 41$s$, and generates a perpendicular recording magnetic field from the tip of the main magnetic pole 41$m$ to the magnetic disk 2. The reproducing element 43 is arranged between a pair of magnetic shields 45.

Returning to the explanation of FIG. 1, the magnetic disk device 1 possesses a main control circuit 10, a read/write channel (R/W channel) 13, and a motor driver 17 over the substrate outside the drive housing 9. The main control circuit 10 includes a micro processing unit (MPU), a hard disk controller (HDC), and a memory. The main control circuit 10 performs various controls, such as position control of the magnetic head 4, according to a program stored in the memory.

In recording, upon receiving user data to be recorded in the magnetic disk 2 from an external host, the main control circuit 10 outputs the user data concerned to the R/W channel 13. The R/W channel 13 modulates the user data, and outputs them to a head amplifier 14. The head amplifier 14 converts the modulated user data into a recording signal, and outputs the recording signal to the magnetic head 4. The magnetic head 4 applies a recording magnetic field corresponding to the recording signal to the track 21, accordingly writes the user data.

Here, the R/W channel 13 generates the recording signal with a time period corresponding to an array period $t_b$ of the magnetic bits 21$b$. That is, the time period of the recording signal is set up so that the time period multiplied by the following speed (the rotational speed of the magnetic disk 2) of the magnetic head 4 to the track 21 becomes equal to the array period or the magnetic bits 21$b$.

In reproducing, the magnetic head 4 reads a reproduction signal from a leakage magnetic field from the track 21, and outputs the reproduction signal to the head amplifier 14. The head amplifier 14 amplifies the reproduction signal, and outputs it to the R/W channel 13. The R/W channel 13 converts the amplified reproduction signal into digital data, demodulates the digital data, and outputs the demodulated digital data to the main control circuit 10. The main control circuit 10 sends the demodulated user data to the external host. The R/W channel 13 outputs the reproduction signal amplitude to the main control circuit 10 if needed.

The R/W channel 13 extracts servo data from the reproduction signal in a predetermined sampling period, and outputs the servo data to the main control circuit 10.

Hereafter, each example of the determination processing performed in the main control circuit 10 is explained. In the determination processing, the phase shift between the phase of the time period of the recording signal and the phase of the array period $t_b$ of the magnetic bits 21$b$ is determined.

Figure 3:
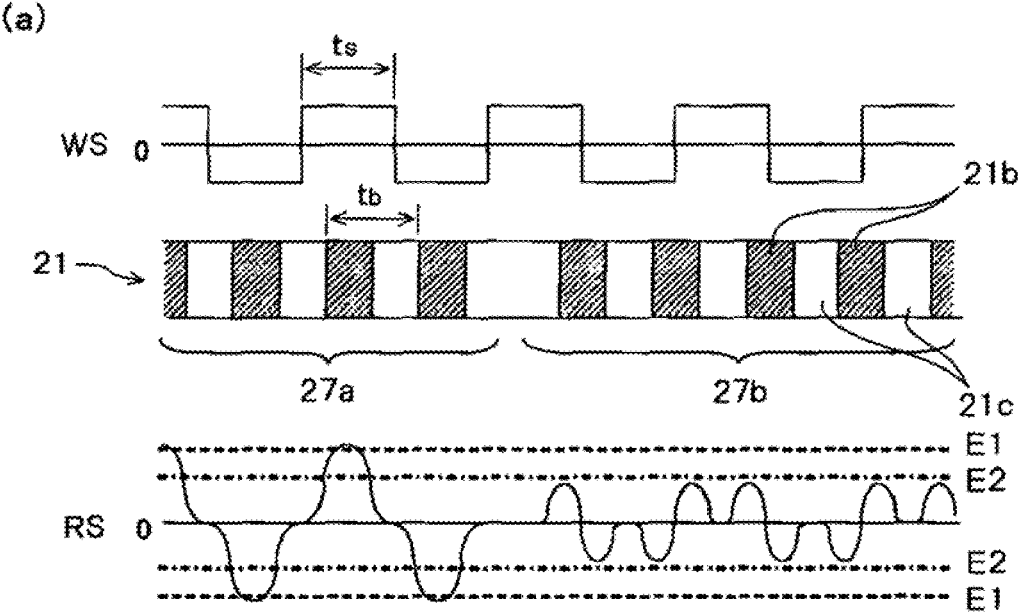
FIG. 3 is an explanatory diagram of a first example of the determination processing.
Figure 3:
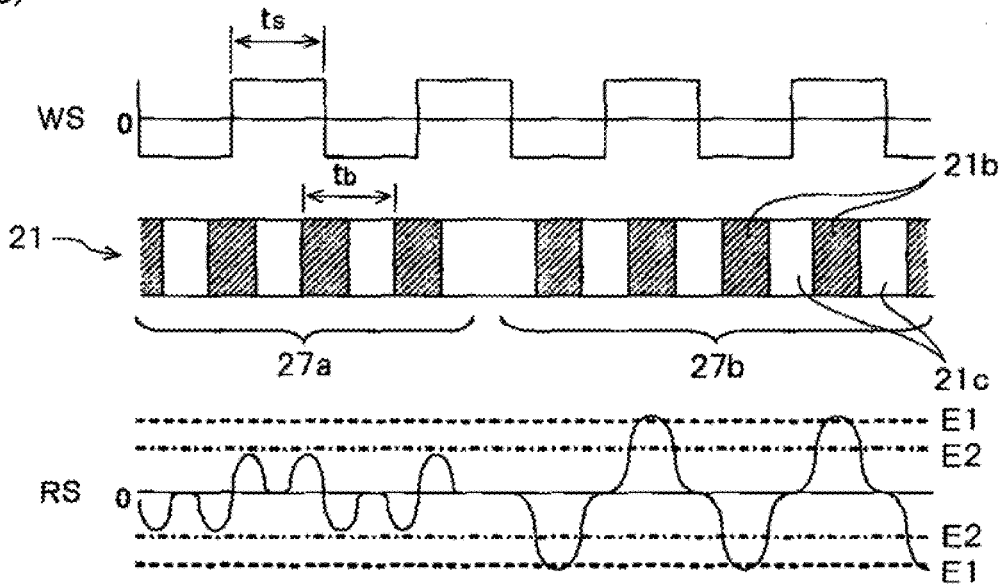

FIG. 3 is an explanatory diagram of the first example of the determination processing. In the figure, the relationship between the phase of a time period $t_s$ of a recording signal WS and the phase of an array period $t_b$ of magnetic bits 21$b$ is shown, according to one embodiment, and a reproduction signal RS read from the track 21 is also shown.

In the present example, the track 21 includes a first section 27$a$ in which the phase of the array period $t_b$ of the magnetic bits 21$b$ is same as most of the track 21, and a second section 27$b$ in which the phase of the array period $t_b$ of the magnetic bits 21$b$ is different from the first section 27$a$ by a half cycle (namely, in an opposite phase). Such a track 21 is provided for every zone of the magnetic disk 2. In the determination processing, data is written to such a track 21 by a recording signal which reverses its polarity per one bit (unit time cycle).

FIG. 3$a$ illustrates a case where no phase shift is present between the array period $t_b$ of the magnetic bits 21$b$ and the time period $t_s$ of the recording signal WS, in the first section 27$a$. That is, in the first section 27$a$, the timing at which the recording signal WS reverses its polarity corresponds to the position of the non-magnetic bit 21$c$, however, in the second section 27$b$, the timing at which the recording signal WS reverses its polarity corresponds to the position of the magnetic bit 21$b$.

Therefore, the amplitude of the reproduction signal RS read from the first section 27$a$ becomes comparatively large, and the amplitude of the reproduction signal RS read from the second section 27$b$ becomes comparatively small. At this time, it is determined that the phase shift is not present when the difference between the amplitude of the reproduction signal RS read from the first section 27$a$ and the amplitude of the reproduction signal RS read from the second section 27$b$ is greater than a predetermined value.

Namely, it is determined that no phase shift is present when the amplitude of the reproduction signal RS read from the first section 27$a$ exceeds a first threshold E1 applied to the case and when the amplitude of the reproduction signal RS read from the second section 27b is less than a second threshold E2 which is smaller than the first threshold E1. These thresholds E1 and E2 are set up based on the amplitude of a reproduction signal when writing is performed with a DC signal, for example.

On the contrary, FIG. 3b illustrates a case where a phase shift is present between the array period $t_b$ of the magnetic bits 21b and the time period t. of the recording signal WS, in the first section 27a. That is, in the first section 27a, the timing at which the recording signal WS reverses its polarity corresponds to the position of the magnetic bit 21b, however, in the second section 27b, the timing at which the recording signal WS reverses its polarity corresponds to the position of the non-magnetic bit 21c. At this time, it is determined that the phase shift is present, since the amplitude of the reproduction signal RS read from the first section 27a is less than the first threshold E1, or the amplitude of the reproduction signal RS read from the second section 27b exceeds the second threshold E2.

Figure 4:
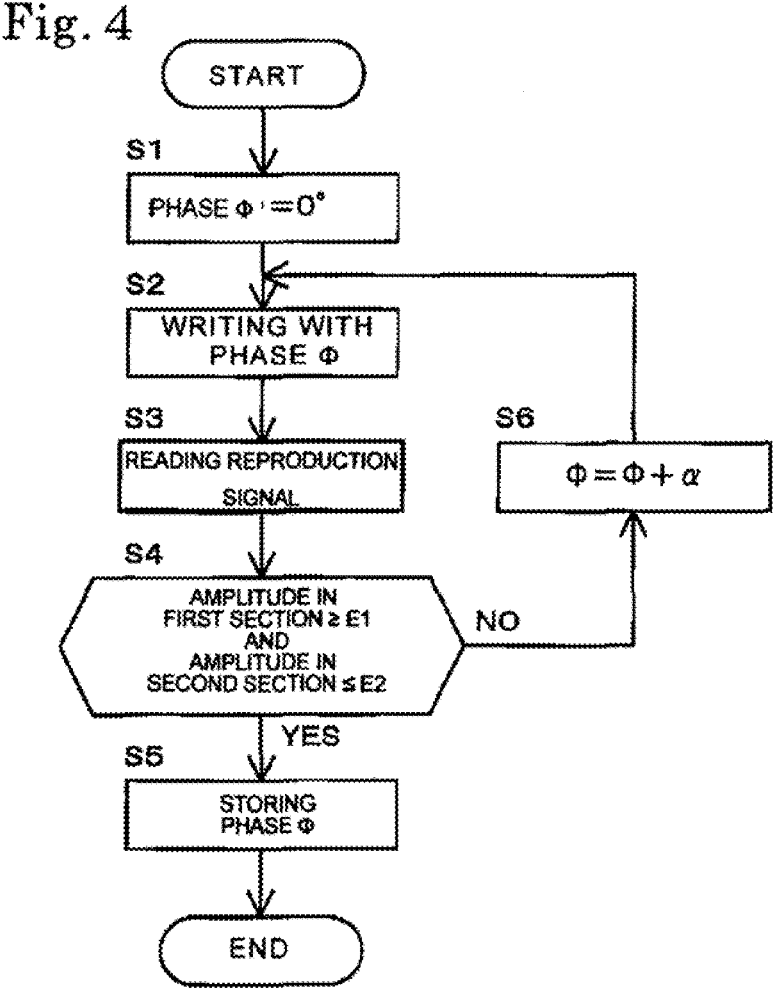
FIG. 4 is a flowchart of the first example of the determination processing.

FIG. 4 is a flowchart of the first example of the determination processing, according to one embodiment. The main control circuit 10 writes data to the track 21 which possesses the first section 27a and the second section 27b as illustrated in FIG. 3, with a recording signal of a phase Φ (the initial phase is 0 degrees) which reverses its polarity per one bit after modulation (Step S1 and Step S2). Then, the main control circuit 10 reads a reproduction signal from the track 21 concerned (Step S3). Next, the main control circuit 10 determines that no phase shift is present when the amplitude of the reproduction signal RS read from the first section 27a exceeds the first threshold E1 and when the amplitude of the reproduction signal RS read from the second section 27b is less than the second threshold E2. However, the main control circuit 10 determines that a phase shift is present when either of the conditions is not satisfied (Step S4: function as judging means).

When no phase shift is present (Step S4: YES), the main control circuit 10 stores the data of the phase Φ at this time in a memory (Step S5). The data of the phase Φ stored in the memory in this way is read at the time of the phase setup of the recording signal in the R/W channel 13.

When a phase shift is present (Step S4: NO), the main control circuit 10 updates the present phase Φ added with a (for example, 10 degrees) as a new phase Φ (Step S6), and performs writing and reading again to determine the phase shift (Steps S2-S4). The main control circuit 10 may repeat such processing until it is determined that no phase shift is present.

Figure 5:
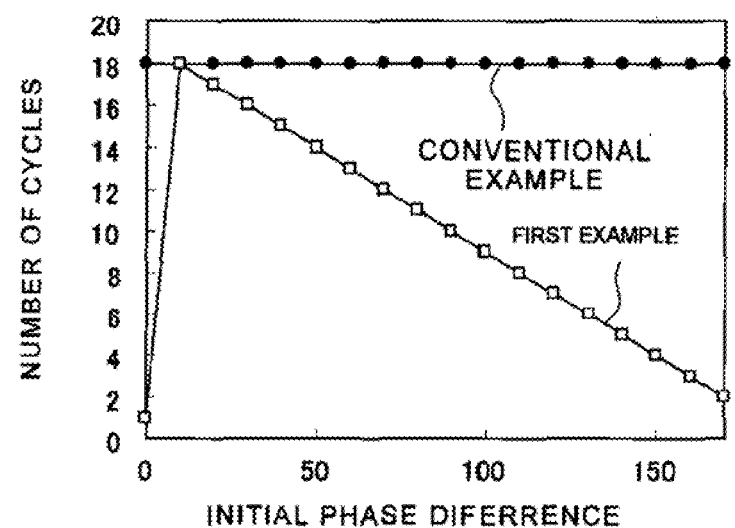
FIG. 5 is an explanatory diagram of the effect of the first example of the determination processing according to one embodiment.

Here, FIG. 5 illustrates the relationship between an initial phase difference and the number of cycles required until a preferred phase is found out by the processing of the present example, according to one embodiment. The initial phase difference means a difference between the phase of the recording signal WS in an initial stage and the preferred phase. In the figure, the conventional example is also shown for comparison. In the conventional example, writing and reading of data is repeated by changing the phase of a recording signal gradually over the entire range, as described in Japanese Patent No. 2006-164349. As illustrated in the figure, it is seen that the processing of the present example requires a fewer number of cycles until a preferred phase is found in many cases, when compared with the conventional example.

Although the phase shift is determined based on the amplitude of the reproduction signal in the present example, it is not restricted to the present case; however, a phase shift may be determined based on a bit error rate. Although the length of the magnetic bit 21b and the length of the nonmagnetic bit 21c are set equal in the present example, it is not restricted to the case; however, either length may be made longer, and a threshold may be set correspondingly. Although α is set constant in the present example, it is not restricted to the case; however, a multi-stage threshold may be provided, and α may be made variable correspondingly. The items described above are common to the other examples to be explained in the following.

Hereafter, the second example of the determination processing is explained. The part which overlaps with the example described above, the detailed explanation thereof is omitted by attaching the same number. In the present example, the recording signal WS, the track 21, and the reproduction signal RS are the same as in the first example (see FIG. 3). That is, the phase of the array period $t_b$ of magnetic bits 21b differs by a half cycle in the first section 27a and the second section 27b.

Figure 6:
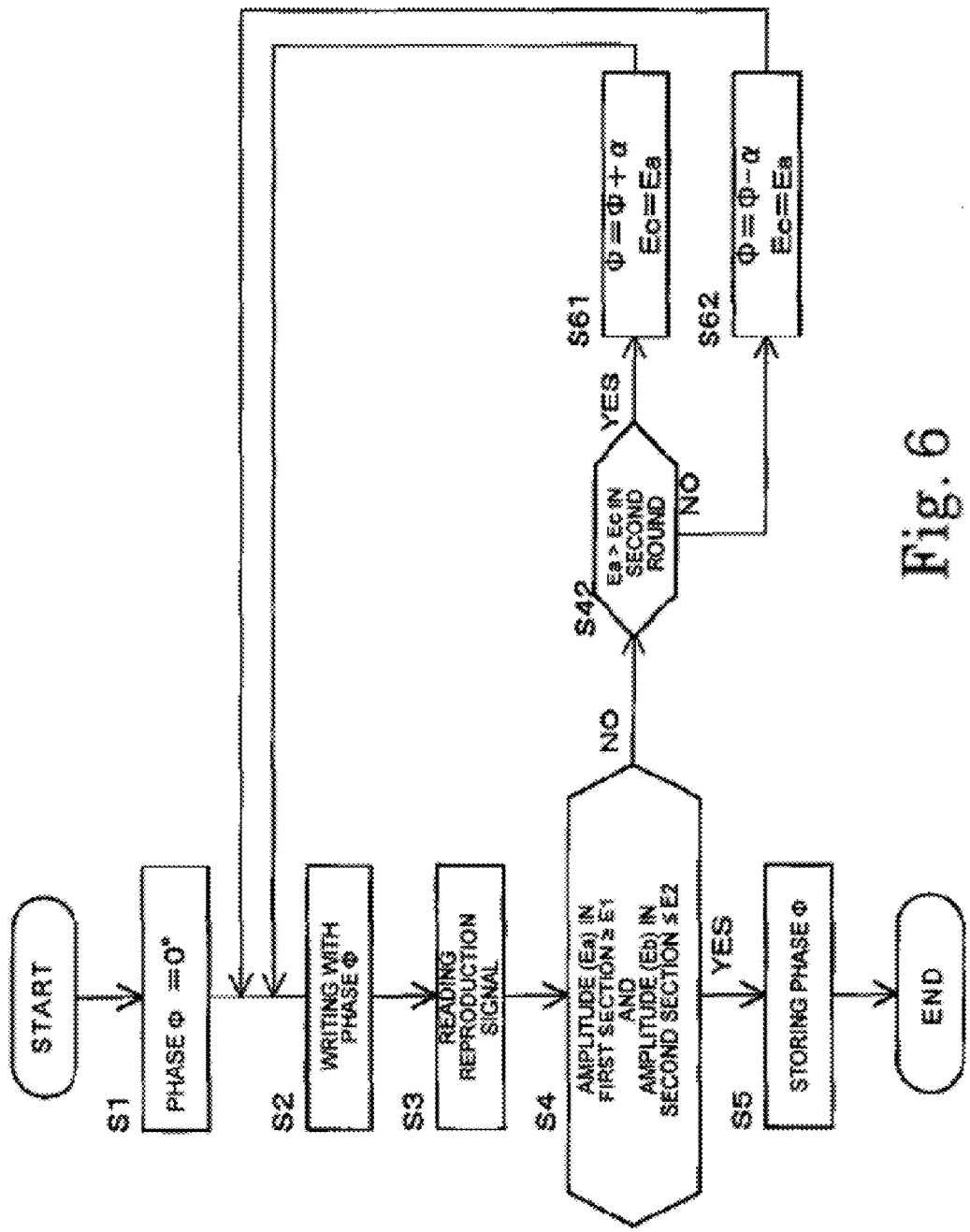
FIG. 6 is an explanatory flowchart of a second example of the determination processing.

FIG. 6 is a flowchart of the second example of the determination processing, according to one embodiment. When a phase shift is present (Step S4: NO), the main control circuit 10 updates the present phase Φ added with α as a new phase Φ in the first round, similarly to the first example described above. At this time, the main control circuit 10 stores the amplitude Ea of the reproduction signal before updating in a memory (let the value be amplitude Ec).

Next, in the second round, the main control circuit 10 compares the amplitude Ea of a reproduction signal read from the first section 27a with the amplitude Ec stored in the memory (Step S42). When the amplitude Ea is greater than the amplitude Ec (Step S42: YES), the main control circuit 10 updates the present phase Φ added with α as a new phase Φ. Similarly in the third round and later, α is continuously added to the phase Φ. On the other hand, when the amplitude Ec is greater (Step S42: NO), the main control circuit 10 updates the present phase α subtracted with α as a new phase Φ, since the phase shift is greater in the second round than in the first round. Similarly in the third round and later, α is continuously subtracted from the phase Φ.

In this way, the number of cycles required until a preferred phase is found may be reduced more, by determining the increase and decrease of phase α based on a magnitude of a relation between the amplitude of the reproduction signal RS in the first round and the amplitude of the reproduction signal RS in the second round.

Figure 7:
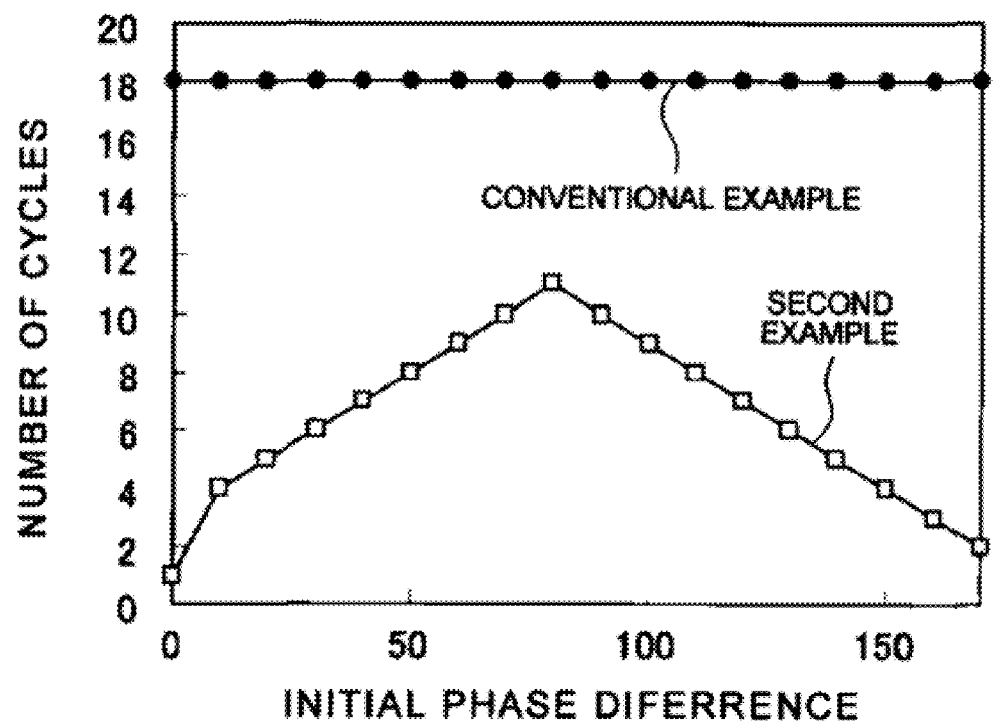
FIG. 7 is an explanatory diagram of the effect of the second example of the determination processing according to one embodiment.

Here, FIG. 7 illustrates the relationship between an initial phase difference and the number of cycles required until a preferred phase is found out by the processing of the present example, according to one embodiment. In the figure, the conventional example is also illustrated similarly to the above. As illustrated in the figure, it is seen that the processing of the present example requires a fewer number of cycles until a preferred phase is found in all cases, when compared with the conventional example.

Hereafter, the third example of the determination processing is explained. The part which overlaps with the example described above, the detailed explanation thereof is omitted by attaching the same number. In the present example, the recording signal WS, the track 21, and the reproduction signal RS are the same as in the first example (see FIG. 3). That is, the phase of the array period $t_b$ of magnetic bits 21b differs by a half cycle in the first section 27a and the second section 27b.

Figure 8:
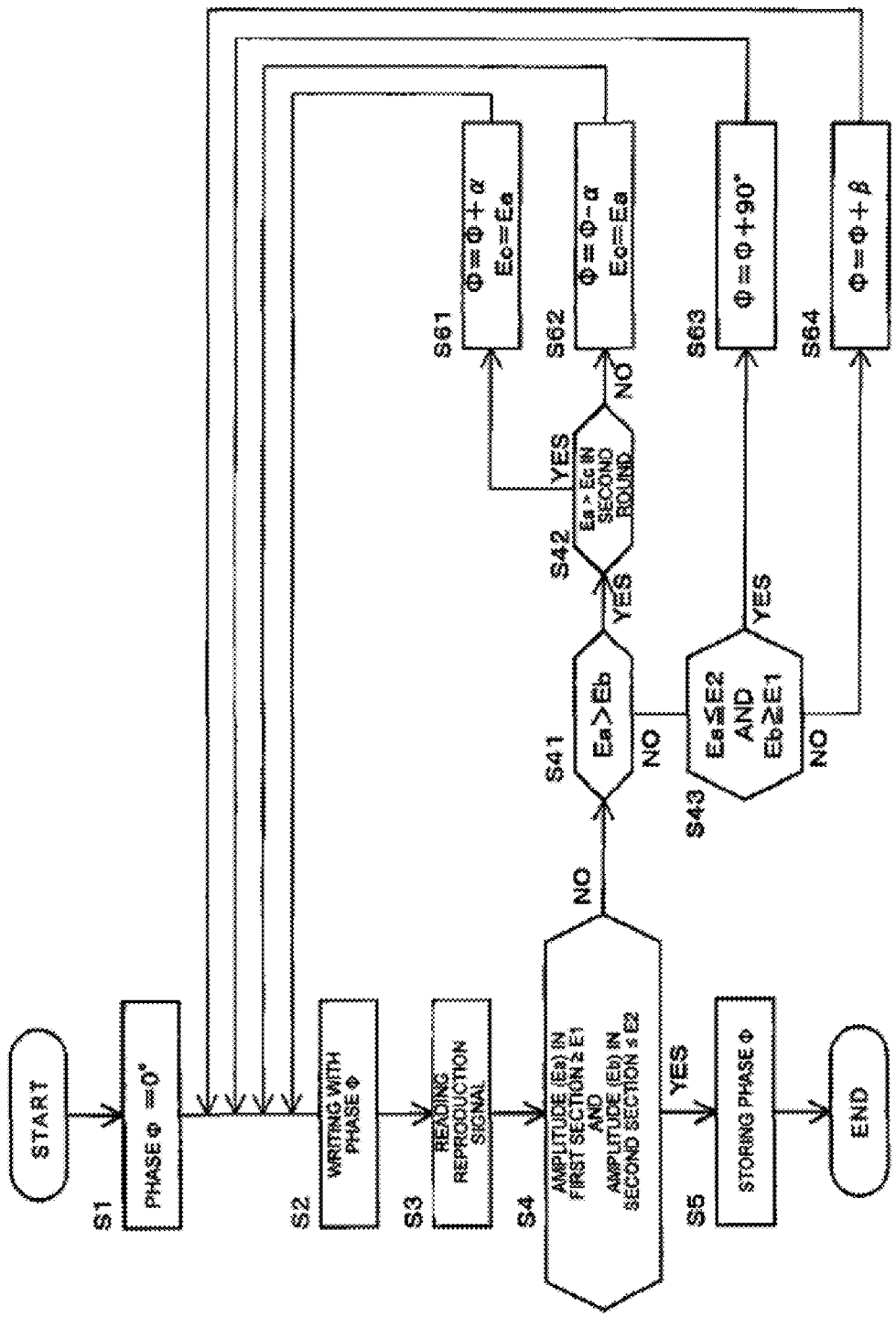
FIG. 8 is an explanatory flowchart of a third example of the determination processing.

FIG. 8 is a flowchart of the third example of the determination processing. When a phase shift is present (Step S4: NO), the main control circuit 10 compares the amplitude Ea of the reproduction signal read from the first section 27a with the amplitude Eb of the reproduction signal read from the second section 27b (Step S41). When the amplitude Ea is greater than the amplitude Eb (Step S41: YES), the main control circuit 10 shifts to the same processing as in the second example (Step 25 S42).

On the other hand, when the amplitude Eb is greater (Step S41: NO), the main control circuit 10 makes the amount of updating of phase Φ greater than α described above, since the phase shift is comparatively great. To be specific, when the amplitude of the reproduction signal RS read from the first section 27a is smaller than the second threshold E2 and the amplitude of the reproduction signal RS read from the second section 27b is greater than the first threshold E1 (Step S43: 35 YES), the phase Φ is updated by adding 90 degrees as a new phase Φ (Step S63) On the other hand, when the present condition is not satisfied (Step S43: NO), the phase Φ is updated by adding amount of updating Φ between α and 90 degrees, as a new phase Φ (Step S64).

In this way, the number of cycles required until a preferred phase is found may be reduced more, by determining the amount of updating of the phase Φ based on a magnitude of a relation between the amplitude of the reproduction signal RS read from the first section 27a and the amplitude of the reproduction signal RS read from the second section 27b.

Figure 9:
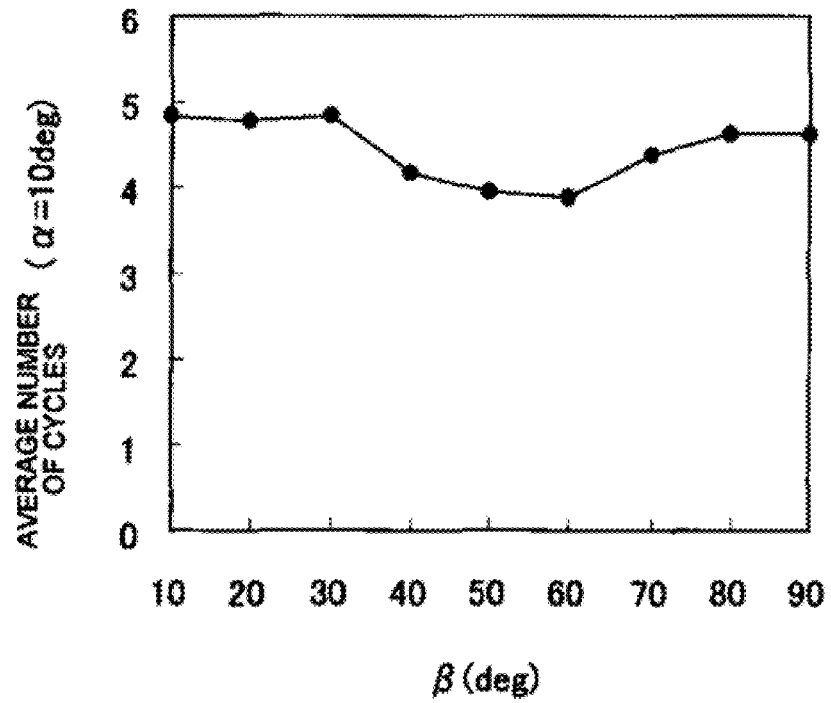
FIG. 9 is an explanatory chart illustrating the search results of updated amounts of phase Φ of the third example of the determination processing.

Here, the search result of preferred amount of updating β in the case of α=10 degrees is illustrated in FIG. 9. As illustrated in this figure, it is seen that the average number of cycles become minimum for β=60 degrees. Accordingly, it is preferable that β=60 degrees.

Figure 10:
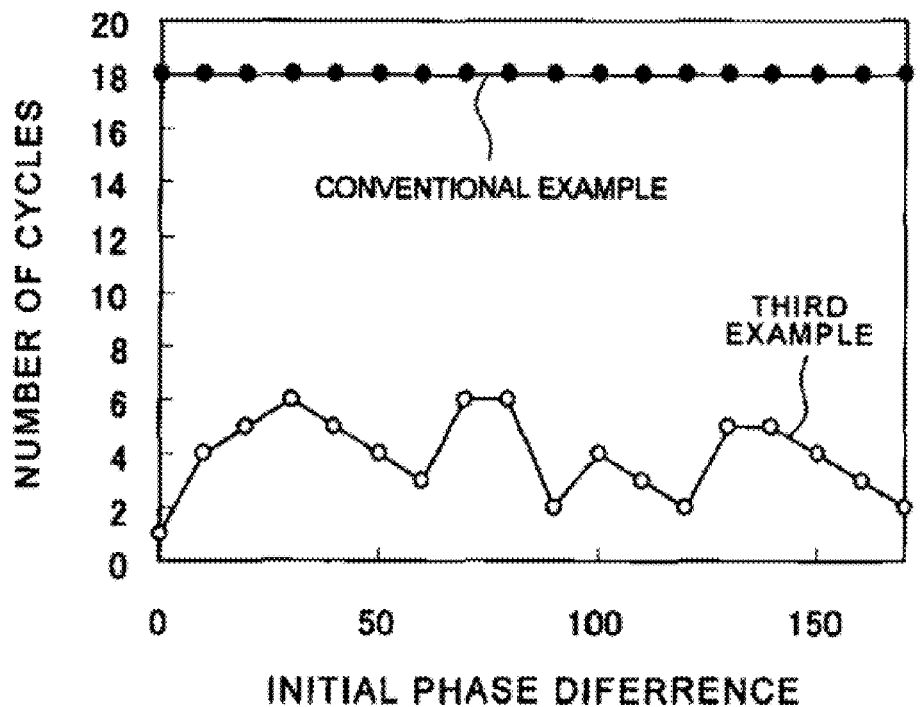
FIG. 10 is an explanatory diagram of the effect of the third example of the determination processing according to one embodiment.

FIG. 10 illustrates the relationship between an initial phase difference and the number of cycles required until a preferred phase is found out by the processing of the present example. In the figure, the conventional example is also illustrated similarly to the above. As illustrated in the figure, it is seen that the processing of the present example requires a fewer number of cycles until a preferred phase is found in all cases, when compared with the conventional example.

Figure 11:
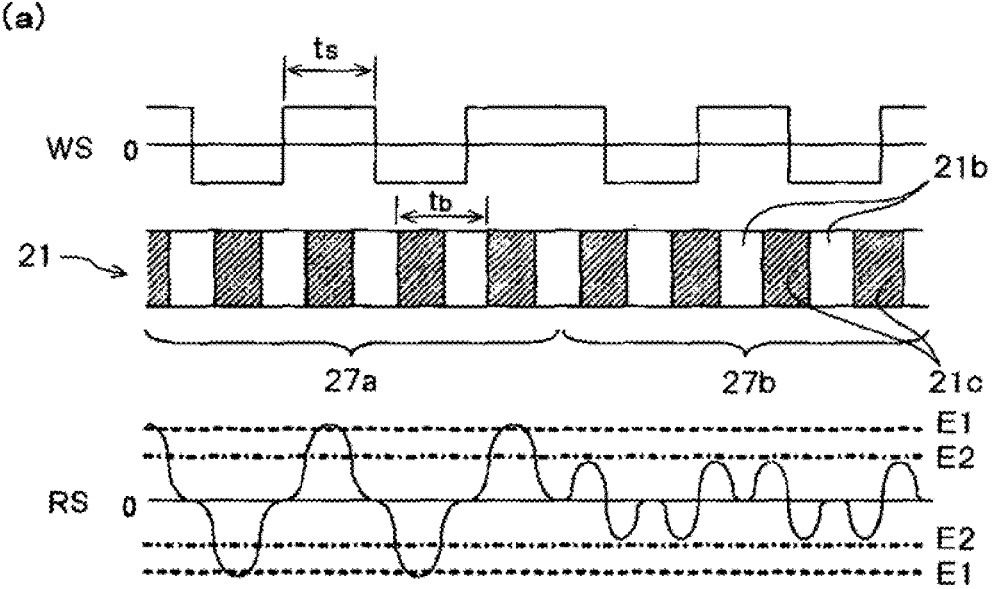
FIG. 11 is an explanatory diagram of a fourth example of the determination processing according to one embodiment.
Figure 11:
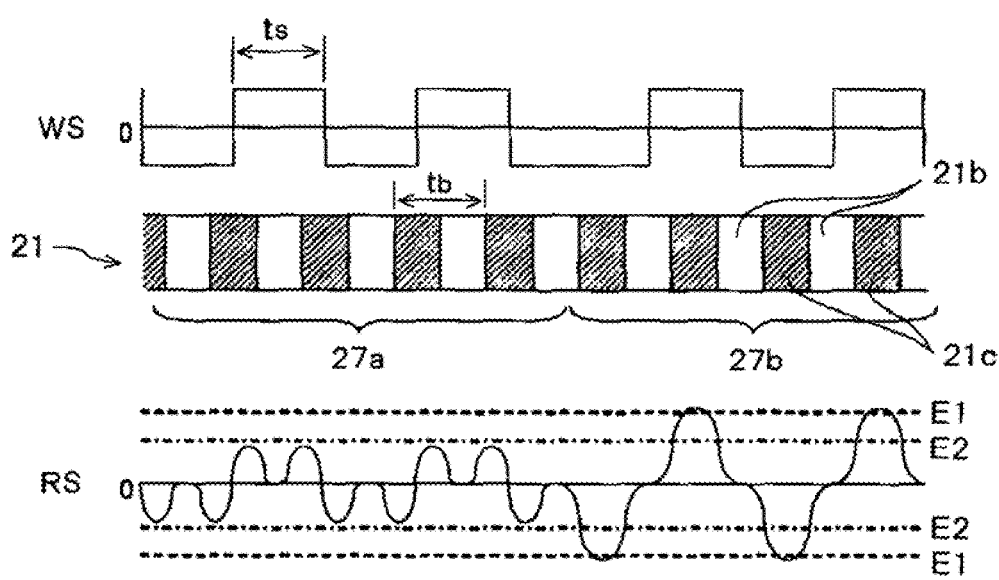

Hereafter, the fourth example of the determination processing is explained. The part which overlaps with the example described above, the detailed explanation thereof is omitted by attaching the same number. FIG. 11 is an explanatory diagram of the fourth example of the determination processing. In the figure, the relationship between the phase of a time period $t_s$ of a recording signal WS and the phase of an array period $t_b$ of magnetic bits 21b is shown, and a reproduction signal RS read from the track 21 is also shown.

In the present example, the phase of the time period $t_s$ of the recording signal WS is set differently in the first section 27a and in the second section 27b by a half cycle (that is, in opposite phase). That is, the recording signal WS reverses its polarity for every bit, and the phase of the recording signal WS shifts by a half cycle in the second section 27b.

FIG. 11a illustrates a case where no phase shift is present between the array period $t_b$ of the magnetic bits 21b and the time period $t_s$ of the recording signal WS in the first section 27a, according to one embodiment. At this time, it is determined that the phase shift is not present, since the amplitude of the reproduction signal RS read from the first section 27a is greater than the first threshold E1, and the amplitude of the reproduction signal RS read from the second section 27b is less than the second threshold E2.

On the contrary, FIG. 11b illustrates the case where the phase shift is present between the array period $t_b$ of the magnetic bits 21b and the time period $t_s$ of the recording signal WS in the first section 27a. At this time, it is determined that the phase shift is present, since the amplitude of the reproduction signal RS read from the first section 27a is less than the first threshold E1, or the amplitude of the reproduction signal RS read from the second section 27b exceeds the second threshold E2.

Any of the flowcharts illustrated in FIG. 4, FIG. 6, and FIG. 8 may be applied to the determination processing in the present example. In this case, the effect corresponding to each example may be obtained.

Figure 12:
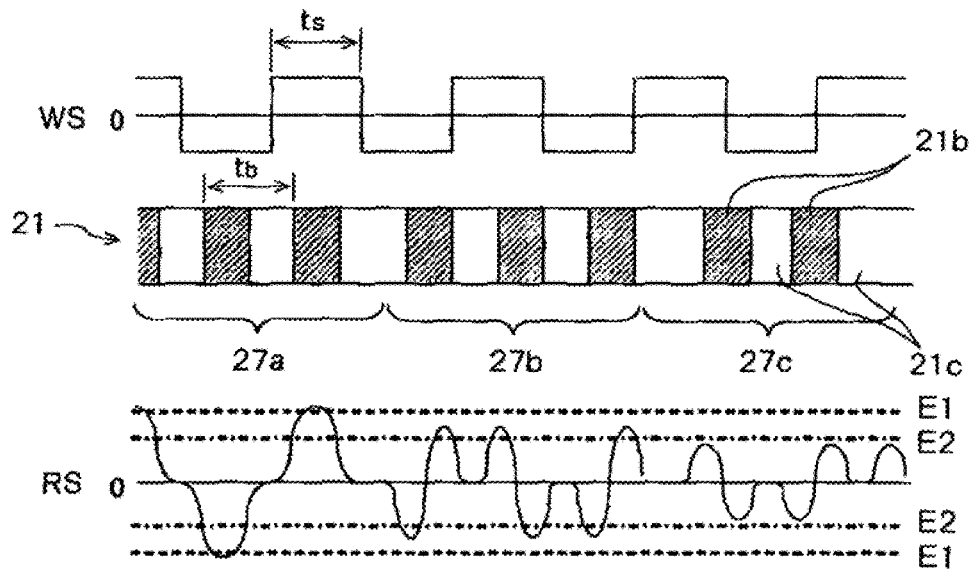
FIG. 12 is an explanatory diagram of a fifth example of the determination processing according to one embodiment.

Hereafter, the fifth example of the determination processing is explained. The part which overlaps with the example described above, the detailed explanation thereof is omitted by attaching the same number. FIG. 12 is an explanatory diagram of the fifth example of the determination processing, according to one embodiment. In the figure, the relationship between the phase of a time period $t_s$ of a recording signal WS and the phase of an array period $t_b$ of magnetic bits 21b is shown, and a reproduction signal RS read from the track 21 is also shown.

In the present example, the track 21 includes a plurality of sections 27a, 27b, and 27c in which the phases of the array period $t_b$ of the magnetic bits 21b are different, respectively. FIG. 12 illustrates the case where no phase shift is present between the array period $t_b$ of the magnetic bits 21b and the time period $t_s$ of the recording signal WS in the first section 27a. In the figure, the three sections are illustrated. However, it may not be restricted to only three sections, and four or more sections may be preferred. Alternatively, the phase of the array period $t_b$ of the magnetic bits 21b in each section may be increased gradually like 0 degrees, 45 degrees, 90 degrees, and so on, for example.

Figure 13:
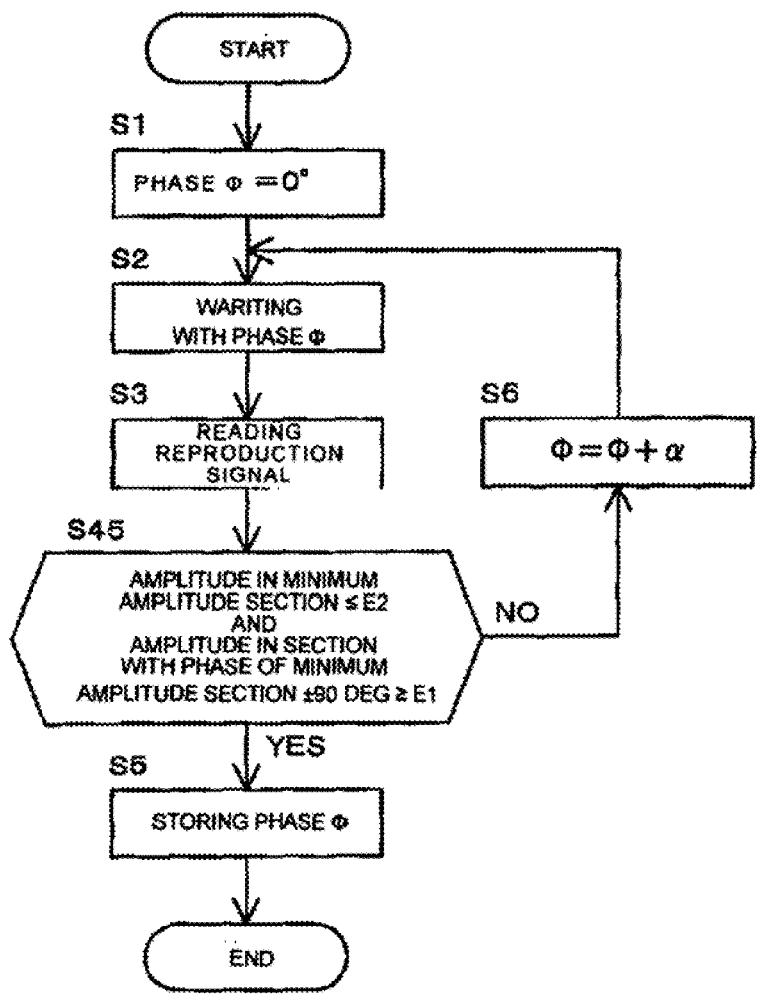
FIG. 13 is an explanatory flowchart of the fifth example of the determination processing.

FIG. 13 is a flowchart of the fifth example of the determination processing, according to one embodiment. When a reproduction signal is read from the track 21 (Step S3), the main control circuit 10 determines a phase shift, by applying the second threshold E2 to a reproduction signal RS of which the amplitude is minimum among the reproduction signals RS read from each of the sections 27a-27c, and by applying the first threshold E1 to a reproduction signal RS read from a section which has different phase by a half cycle from the section of the minimum amplitude (or a section nearest to it) (Step S45).

For example, as illustrated in FIG. 12, when the amplitude of the reproduction signal RS read from the first section 27a exceeds the first threshold E1, and the amplitude of the reproduction signal RS read from the third section 27c is less than the second threshold (Step S45: YES), the main control circuit 10 stores the data of phase Φ in the first section 27a in a memory (Step S5). On the other hand, when this condition is not satisfied (Step S45; NO), the main control circuit updates the present phase Φ added with a (for example, 15 degrees) as a new phase Φ (Step S6), performs writing and reading again (Steps S2, S3), and determines the phase shift (Step S45).

Not restricted to the case described above, it may also be preferable that the first threshold E1 be applied to the reproduction signal RS with the maximum amplitude, and that the second threshold E2 may be applied to the reproduction signal RS of a section in which the phase is different by a half cycle from the section from which the reproduction signal with the maximum amplitude is read. Alternatively, it is also preferable that the first threshold E1 is applied to the reproduction signal RS with the maximum amplitude, and that the second threshold E2 is applied to the reproduction signal RS with the minimum amplitude.

Figure 14:
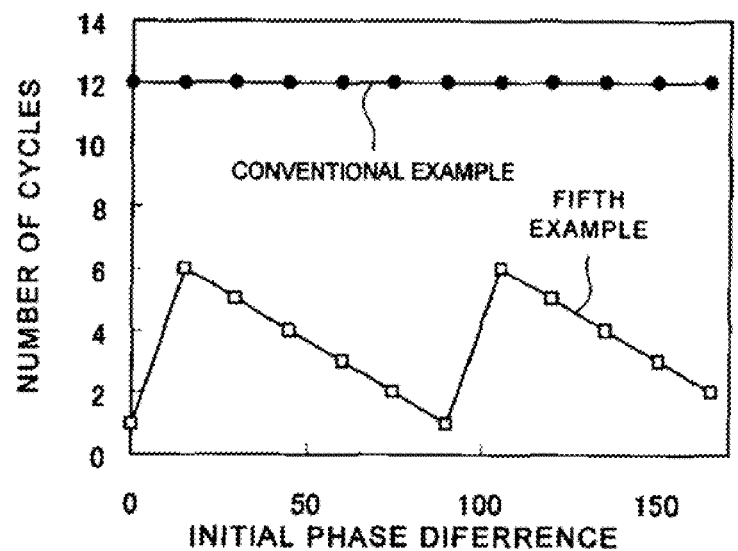
FIG. 14 is an explanatory diagram of the effect of the fifth example of the determination processing according to one embodiment.

Here, FIG. 14 illustrates the relationship between an initial phase difference and the number of cycle performed until a preferred phase is found out by the processing of the present example. In the figure, the conventional example is also illustrated similarly to the above. As illustrated in the figure, it is seen that the processing of the present example performs a fewer number of cycles until a preferred phase is found in all cases, when compared with the conventional example.

Figure 15:
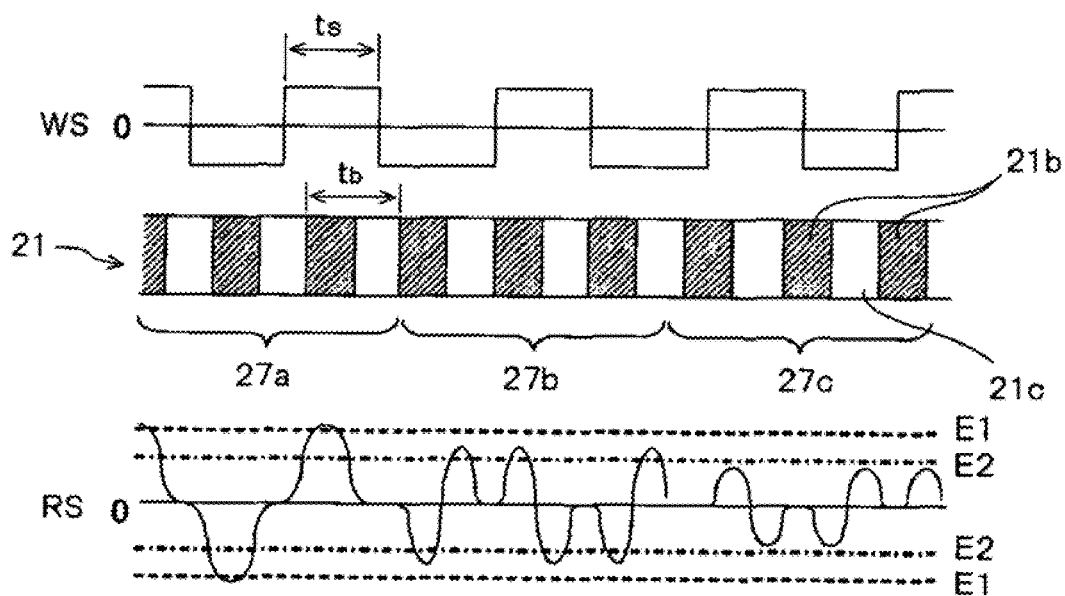
FIG. 15 is an explanatory diagram of a sixth example of the determination processing according to one embodiment.

Hereafter, the sixth example of the determination processing is explained, according to one embodiment. The part which overlaps with the example described above, the detailed explanation thereof is omitted by attaching the same number. FIG. 15 is an explanatory diagram of the sixth example of the determination processing. In the figure, the relationship between the phase of a time period $t_s$ of a recording signal WS and the phase of an array period $t_b$ of magnetic bits 21$b$ is shown, and a reproduction signal RS read from the track 21 is also shown.

In the present example, the phase of the time period $t_s$ of the recording signal WS is set differently to each of plural sections 27$a$, 27$b$, and 27$c$. FIG. 15 illustrates a case where there is no phase shift between the array period $t_b$ of the magnetic bits 21$b$ and the time period $t_s$ of the recording signal WS in the first section 27$a$. In the figure, the three sections are illustrated. However, it may not be restricted to only three sections, but four or more sections may be preferred. Alternatively, the phase or the time period $t_s$ of the recording signal WS in each section may be increased gradually like 0 degrees, 45 degrees, 90 degrees, and so on, for example.

The flowchart illustrated in FIG. 13 is applicable to the determination processing in the present example. In this case, the effect similar to the case of the fifth example may be obtained.

One goal of the present invention, according to some embodiments, is to provide a control method of a magnetic disk device which may determine simply and quickly a phase shift between an array period of magnetic elements and a time period of a recording signal.

In order to accomplish this goal, a control method of a magnetic disk device, according to one embodiment, writes data by varying a phase of an array period $t_b$ of magnetic elements 21$b$ or a phase of a time period $t_s$ of a recording signal WS in one section 27$b$ of a track 21 from the corresponding phase in the other section 27$a$, performs reading of a reproduction signal from the track 21, and determines a phase shift between the array period $t_b$ of the magnetic elements 21$b$ and the time period $t_s$ of the recording signal WS, based on a reproduction signal RS read from one section 27$b$ and a reproduction signal RS read from the other section 27$a$.

Several embodiments of the present invention have been explained above; however, the present invention is not restricted to the embodiments, and it is needless to say that various kinds of modified practices are possible for a person skilled in the art.

The following list is a description of the reference numerals and signs, and is provided for quick reference to the references consistent throughout the various figures included herein:

1: Magnetic disk device
2: Magnetic disk
3: Spindle motor
4: Magnetic head
5, 6: Head assembly
7: Voice coil motor
9: Drive housing
10: Main control circuit
13: R/W channel
14: Head amplifier
17: Motor driver
21: Track
21$b$: Magnetic bit (magnetic element)
21$c$: Non-magnetic bit (groove)
23: Non-recording layer
27$a$: First section
27$b$: Second section
41: Recording element
41$m$: Main magnetic pole
41$s$: Sub magnetic pole
43: Reproducing element
45: Magnetic shield

What is claimed is:

1. A magnetic disk device including:
a magnetic disk possessing a track in which a plurality of magnetic elements magnetically separated from each other are arranged in a predetermined array period;
a magnetic head which follows the track and writes data upon receiving a recording signal possessing a time period corresponding to an array period of the plurality of magnetic elements; and
a control circuit configured to perform a control method, the control method comprising:
writing the data by varying a phase of the array period of the plurality of magnetic elements or a phase of the time period of the recording signal in one section of the track from a corresponding phase in another section of the track;
reading a reproduction signal from the track; and
determining a phase shift between the array period of the plurality of magnetic elements and the time period of the recording signal, based on a reproduction signal read from the one section and a reproduction signal read from the other section,
wherein the determining the phase shift between the array period of the plurality of magnetic elements and the time period of the recording signal is performed, based on a magnitude of a relation between the amplitude of the reproduction signal read from the one section and the amplitude of the reproduction signal read from the other section.

2. The magnetic disk device of claim 1, wherein the writing the data is performed with the recording signal of which a level is reversed at every unit time period.

3. The magnetic disk device of claim 1, wherein the phase of the array period of the plurality of magnetic elements or the phase of the time period of the recording signal in the one section is different from the corresponding phase in the other section by a half period.

4. The magnetic disk device of claim 1, wherein the determining the phase shift between the array period of the plurality of magnetic elements and the time period of the recording signal is performed, based on amplitude of the reproduction signal read from the one section and amplitude of the reproduction signal read from the other section.

5. The magnetic disk device of claim 1, wherein the presence or absence of the phase shift between the array period of the magnetic elements and the time period of the recording signal is determined, based on whether a difference greater than a predetermined magnitude exists between the amplitude of the reproduction signal read from the one section and the amplitude of the reproduction signal read from the other section.

6. The magnetic disk device of claim 1, wherein when the phase shift is determined, the determining the phase shift is performed again after updating the phase of the time period of the recording signal.

7. The magnetic disk device of claim 1, wherein information on the phase of the time period of the recording signal is stored in a storage unit, the phase being determined based on the determination result of the phase shift.

8. The magnetic disk device of claim 7, wherein the phase of the time period of the recording signal to be outputted to the magnetic head is set based on the information stored in the storage unit.

9. The magnetic disk device of claim 7, wherein the reproduction signal is read from the track in which the data is written by varying the phase of the array period of the plurality of magnetic elements or the phase of the time period of the recording signal in each of a plurality of sections, and wherein the phase shift between the array period of the plurality of magnetic elements and the time period of the recording signal is determined, based on the reproduction signal read out from each of the plurality of sections.

10. A magnetic disk device including:
   a magnetic disk possessing a track in which a plurality of magnetic elements magnetically separated from each other are arranged in a predetermined array period;
   a magnetic head which follows the track and writes data upon receiving a recording signal possessing a time period corresponding to an array period of the plurality of magnetic elements; and
   a control circuit configured to perform a control method, the control method comprising:
      writing the data by varying a phase of the array period of the plurality of magnetic elements or a phase of the time period of the recording signal in one section of the track from a corresponding phase in another section of the track;
      reading a reproduction signal from the track; and
      determining a phase shift between the array period of the plurality of magnetic elements and the time period of the recording signal, based on a reproduction signal read from the one section and a reproduction signal read from the other section,
      wherein the presence of the phase shift between the array period of the plurality of magnetic elements and the time period of the recording signal is determined, based on whether one of: the amplitude of the reproduction signal read from the one section and the amplitude of the reproduction signal read from the other section, is greater than a first threshold and the other amplitude is less than a second threshold which is smaller than the first threshold.

11. The magnetic disk device of claim 10, wherein the writing the data is performed with the recording signal of which a level is reversed at every unit time period.

12. The magnetic disk device of claim 10, wherein the phase of the array period of the plurality of magnetic elements or the phase of the time period of the recording signal in the one section is different from the corresponding phase in the other section by a half period.

13. The magnetic disk device of claim 10, wherein the determining the phase shift between the array period of the plurality of magnetic elements and the time period of the recording signal is performed, based on amplitude of the reproduction signal read from the one section and amplitude of the reproduction signal read from the other section.

14. The magnetic disk device of claim 10, wherein information on the phase of the time period of the recording signal is stored in a storage unit, the phase being determined based on the determination result of the phase shift.

15. A magnetic disk device including:
   a magnetic disk possessing a track in which a plurality of magnetic elements magnetically separated from each other are arranged in a predetermined array period;
   a magnetic head which follows the track and writes data upon receiving a recording signal possessing a time period corresponding to an array period of the plurality of magnetic elements; and
   a control circuit configured to perform a control method, the control method comprising:
      writing the data by varying a phase of the array period of the plurality of magnetic elements or a phase of the time period of the recording signal in one section of the track from a corresponding phase in another section of the track;
      reading a reproduction signal from the track; and
      determining a phase shift between the array period of the plurality of magnetic elements and the time period of the recording signal, based on a reproduction signal read from the one section and a reproduction signal read from the other section,
      wherein the presence of the phase shift between the array period of the plurality of magnetic elements and the time period of the recording signal is determined, based on an error rate of the reproduction signal read from the one section and an error rate of the reproduction signal read from the other section.

16. The magnetic disk device of claim 15, wherein the writing the data is performed with the recording signal of which a level is reversed at every unit time period.

17. The magnetic disk device of claim 15, wherein the phase of the array period of the plurality of magnetic elements or the phase of the time period of the recording signal in the one section is different from the corresponding phase in the other section by a half period.

18. The magnetic disk device of claim 15, wherein the determining the phase shift between the array period of the plurality of magnetic elements and the time period of the recording signal is performed, based on amplitude of the reproduction signal read from the one section and amplitude of the reproduction signal read from the other section.

19. A magnetic disk device including:
   a magnetic disk possessing a track in which a plurality of magnetic elements magnetically separated from each other are arranged in a predetermined array period;
   a magnetic head which follows the track and writes data upon receiving a recording signal possessing a time period corresponding to an array period of the plurality of magnetic elements; and
   a control circuit configured to perform a control method, the control method comprising:
      writing the data by varying a phase of the array period of the plurality of magnetic elements or a phase of the time period of the recording signal in one section of the track from a corresponding phase in another section of the track;
      reading a reproduction signal from the track; and
      determining a phase shift between the array period of the plurality of magnetic elements and the time period of the recording signal, based on a reproduction signal read from the one section and a reproduction signal read from the other section,
      wherein when the phase shift is determined, the determining the phase shift is performed again after updating the phase of the time period of the recording signal,
      wherein increase and decrease of the phase of the time period of the recording signal is determined, based on a magnitude of a relation between the amplitude of the reproduction signal before the updating and the amplitude of the reproduction signal after the updating.

20. A magnetic disk device including:

a magnetic disk possessing a track in which a plurality of magnetic elements magnetically separated from each other are arranged in a predetermined array period;

a magnetic head which follows the track and writes data upon receiving a recording signal possessing a time period corresponding to an array period of the plurality of magnetic elements; and a control circuit configured to perform a control method, the control method comprising:

writing the data by varying a phase of the array period of the plurality of magnetic elements or a phase of the time period of the recording signal in one section of the track from a corresponding phase in another section of the track;

reading a reproduction signal from the track; and determining a phase shift between the array period of the plurality of magnetic elements and the time period of the recording signal, based on a reproduction signal read from the one section and a reproduction signal read from the other section, wherein when the phase shift is determined, the determining the phase shift is performed again after updating the phase of the time period of the recording signal, wherein an amount of updating of the phase of the time period of the recording signal is determined, based on a magnitude of a relation between the amplitude of the reproduction signal read from the one section and the amplitude of the reproduction signal read from the other section.

\* \* \* \* \*

UNITED STATES PATENT AND TRADEMARK OFFICE
CERTIFICATE OF CORRECTION

Page 1 of 1

PATENT NO. : 8,049,986 B2
APPLICATION NO. : 12/543845
DATED : November 1, 2011
INVENTOR(S) : Ito et al.

It is certified that error appears in the above-identified patent and that said Letters Patent is hereby corrected as shown below:

In the specification:

col. 6, line 11 replace "or" with --of--;
col. 11, line 22 replace "or" with --of--.

Signed and Sealed this
Twenty-seventh Day of December, 2011

David J. Kappos
*Director of the United States Patent and Trademark Office*